United States Patent [19]
Natwig

[11] 4,426,549
[45] Jan. 17, 1984

[54] TRACK AND EROSION RESISTANT ELECTRICAL INSULATION COMPRISING ZINC BORATE AND ETHYLENE POLYMER

[75] Inventor: Gary S. Natwig, Wilmington, Mass.

[73] Assignee: High Voltage Engineering Corporation, Burlington, Mass.

[21] Appl. No.: 396,755

[22] Filed: Jul. 9, 1982

Related U.S. Application Data

[63] Continuation of Ser. No. 226,138, Jan. 19, 1981, abandoned.

[51] Int. Cl.$^3$ .................. H01B 3/44; H01B 17/62
[52] U.S. Cl. .................. 174/110 PM; 174/110 V; 174/121 A; 174/137 B; 336/96; 200/144 C; 524/405
[58] Field of Search ..... 174/110 A, 110 SR, 110 PM, 174/DIG. 1, 121 A; 260/37 M, 45.75 W, 42.11; 336/96; 200/144 C

[56] References Cited

U.S. PATENT DOCUMENTS 3,912,650 10/1975 Khalid et al. .............. 260/37 SB X

OTHER PUBLICATIONS

Chemical Abstracts: 84:151569c, 1976, 77:35588q, 1972, 92:111747t, 1980.

*Primary Examiner*—John D. Welsh
*Attorney, Agent, or Firm*—Henry C. Nields

[57] ABSTRACT

Track and erosion resistant electrical insulating materials are disclosed comprising (a) a base insulating material comprising a polymer of ethylene and additives necessary to allow the polymer to function as electrical insulation, and (b) hydrated zinc borate as an anti-tracking and anti-erosion additive. The hydrated zinc borate functions to increase the track and erosion resistance of the electrical insulating material in concentrations of as little as 1% by weight of the entire material with its maximum effect being achieved at concentrations of about 25% by weight of the entire material.

6 Claims, No Drawings

TRACK AND EROSION RESISTANT ELECTRICAL INSULATION COMPRISING ZINC BORATE AND ETHYLENE POLYMER

This application is a continuation of application Ser. No. 226,138, filed Jan. 19, 1981 now abandoned.

BACKGROUND

1. Field of Invention

The present invention relates to an improved electrical insulating material, and, in particular to an improved electrical insulating material comprising at least one polymer of ethylene and an improved anti-tracking, anti-erosion additive.

2. Brief Description of the Prior Art

The occurrence of the phenomenon of tracking in polymeric materials used as electrical insulation in environments wherein they are exposed to contaminated or polluted atmospheres has long been recognized as a source of electrical insulation failure in such applications. This is particularly true of heat shrinkable tubing used in high voltage splices and in high voltage terminations used by utility companies. Generally speaking, this phenomenon results from the fact that the insulation above described gradually acquires a conductive film of contaminants on its surface which, when the insulation is subjected to high voltage stress, will over time allow a small amount of leakage current to conduct along the surface. The resulting temperature rise causes a drying out of the insulation. Once this has happened the dry surface areas so formed can frequently encounter electrical stress greater than the insulation air interface, thereby resulting in a spark or scintillation. The tremendous temperatures in the spark interior, often exceeding 2000° C., can quickly degrade the insulation to carbonaceous material that is highly conducting. This in turn leads to additional scintillations and material degradation eventually resulting in a burned, tree-like pattern on the surface of the insulation. When the span between electrodes has been fully bridged by this pattern, failure due to creepage tracking has occurred.

Similarly, over-voltage exposure also tends to cause gradual and progressive erosion or cratering of the insulation over time. The resulting lessening of the insulation thickness causes a corresponding decrease in the insulative characteristics of the insulation in the eroded area and can lead to insulation failure if such erosion is not inhibited.

It should be understood that discharges of the creepage tracking type are not the same as those caused by the establishment of an arc between two elements of an apparatus having different potentials, and that materials which have been found to be effective in inhibiting direct arcing are not necessarily effective in inhibiting creepage tracking. This fact was disclosed by Kessel et al in U.S. Pat. No. 2,997,526 and our tests tend to confirm this distinction.

Numerous proposals are present in the art for the prevention and/or inhibiting of creepage tracking. Of these proposals, the most widely accepted has been the incorporation of hydrated alumina, preferably the trihydrate, in fairly substantial quantities into the insulating material as is disclosed for example in U.S. Pat. Nos. 2,997,526; 2,997,527; 2,997,528; and 4,100,089. It has been found, however, that the large amounts of hydrated alumina required frequently undermine the physical properties of the insulation, and that, depending on the polymer system involved, the hydrated alumina exhibits fairly widely varying degrees of effectiveness. In the case of polyolefin materials such as polyethylene and copolymers like ethylene-vinyl acetate which are widely used in the making of heat-shrinkable insulation, for example, testing has shown that alumina trihydrate provides only minimal protection against tracking. The reasons for this are not clear. Polyethylene and related polyolefins are known to be among the most track resistant of polymers. It is similarly well known that polyethylene and/or related polyolefin insulation requires the presence of additives such as anti-oxidants, lubricants, and crosslinking agents with the basic insulating material to insure the desired physical characteristics thereof. These additivies usually lower the track resistance of the insulation below that of the pure polymer. The addition of alumina trihydrate improves the track resistance of insulation composed of polyolefin and additives somewhat, but does not always even bring it to the point at which the pure resin itself tracks.

In addition, it has been found, for example in U.S. Pat. Nos. 4,100,089 and 4,223,071, that alumina trihydrate does not adequately increase erosion resistance and that therefore separate additives are required for that purpose.

SUMMARY OF THE INVENTION

Accordingly, one object of this invention is to provide an improved material for use as high voltage insulation. Another object of this invention is to provide a track resistant insulating material wherein the quantity of anti-tracking additive required is not so great as to degrade the physical properties of the insulation. Yet another object of the present invention is to provide a track resistant insulating material that can be fabricated into heat shrinkable articles and crosslinked by chemical means or by ionizing radiation. Still another object of the present invention is to provide both track and erosion resistance to high voltage insulation with the same additive.

These and other objects and advantages are obtained in accordance with the present invention by forming an electrically insulating material comprising a base material comprising a polymer of ethylene and associated additives; and hydrated zinc borate as an anti-tracking anti-erosion additive. The composition functions when used as high voltage insulation to inhibit failure due to creepage tracking and/or erosion when hydrated zinc borate comprises about 1% by weight of the entire composition and exceeds the track resistance of the pure polymer of the base material when the hydrated zinc borate constitutes about 25% of the entire insulating material. Generally speaking, in insulation utilizing polyethylene and related polyolefin systems as a base material it has been found that the use of hydrated zinc borate as an anti-tracking additive reduces the amount of anti-tracking additive required to produce a given level of track resistance in the insulating material by about two thirds with respect to a situation wherein alumina trihydrate is utilized as the anti-tracking additive.

DETAILED DESCRIPTION OF THE INVENTION

The present invention arises from the unexpected discovery that hydrated zinc borate is superior to hydrated alumina as an anti-tracking additive in polyethylene and related polyolefin based insulating materials.

Accordingly, the present invention contemplates the formation of improved electrical insulating materials comprising (a) a base material comprising polyolefin material such as polyethylene and/or copolymers such as ethylene-vinyl acetate, and (b) zinc borate as an anti-tracking additive.

As will more fully hereinafter appear, it has been found that unlike hydrated alumina, which has been demonstrated to be useful as an anti-tracking additive for a wide range of polymeric based insulation materials, the utility of hydrated zinc borate as an anti-tracking additive appears to be limited to polyethylene and related polyolefin based materials. However, it has also been found that improvements in track resistance are noticable when hydrated zinc borate comprises as little as 1% by weight of the entire insulating material (polyolefin plus additives plus hydrated zinc borate) and that increases in the quantity of hydrated zinc borate added to a given quantity of polyolefin plus additives increases the track resistance of the resulting insulating material until the hydrated zinc borate comprises about 25% by weight of the entire insulating material. Increasing the amount of hydrated zinc borate beyond the latter concentration neither increases nor decreases the track resistance of the resulting insulating material, but increases beyond the point at which the hydrated zinc borate constitutes about 40% by weight of the entire insulating material does result in decline in the physical properties of the insulation.

The foregoing findings are significant because they indicate that polyethylene and related polyolefin based insulating materials may now be given significant resistance to creepage tracking without undermining the physical properties of the insulation due to the large quantities of anti-tracking additive involved or to the development of undue porosity in the finished insulation resulting from losses of hydrated water from the anti-tracking additive caused by the high temperatures used and/or radiation employed in cross-linking the polyolefin. Clearly, the use of between about 1% and about 25% by weight of the entire insulating material of hydrated zinc borate to achieve the track resistance previously possible only using 25% to 90%, and preferrably at least 50%, by weight of the entire insulating material of hydrated alumina will be understood by those in the art to be extremely advantageous. This is especially so since the physical properties of polyethylene and related polyolefin based insulating materials, deteriorate when alumina hydrate added as an anti-tracking additive constitutes more than about 32% by weight of the entire insulation.

In order that those skilled in the art may better understand the practice of the present invention and the extent of the present disclosure the following examples are given. These examples are intended to be illustrative only and limitations upon the present invention not expressly shown therein should not be inferred. The test procedure used in each case was that according to ASTM D-2303 and the breakdown voltages indicated represent the average voltage at which creepage tracking commenced over a plurality of separate tests of each material. Unless otherwise indicated each sample material was prepared on a hot two-roll mill and subsequently press cured at 350° F. for 15 minutes and molded into a 2" by 5" by 0.25" sample plaque. Each sample was then tested by (1) placing it in a holder at an angle of substantially 45°; (2) attaching a pair of high voltage electrodes connected to variable voltage source to the sample, one to the top and one to the bottom edge thereof; (3) causing a steady stream of contaminant, herein a solution of 0.1% ammonium chloride ($NH_4Cl$ and 0.02% Triton X-100 (a wetting agent)) in distilled water, to flow from a small tube attached to the top electrode down the upper surface of the sample; (4) applying an initial potential difference by 3 KV to the electrodes; and (5) increasing the potential difference hourly by 0.25 KV until breakdown is noted. If breakdown did not occur within 5 voltage steps, a new sample was tested at a higher initial voltage.

EXAMPLE 1

In this series of tests the effectiveness of hydrated zinc borate as an anti-tracking additive was compared with a control having no anti-tracking additive and with materials containing comparable amounts of alumina trihydrate of various particle sizes. The results of these test appear in Table Ia wherein all units are parts by weight unless otherwise indicated. Table Io shows the results of a similar series of tests on an insulating material, wherein the polymer system comprised a mixture of polyethylene and ethylene-propylene-diene terpolymer.

TABLE Ia

COMPARISON OF HYDRATED ZINC BORATE WITH ALUMINUM TRIHYDRATE

| | | | | | |
|---|---|---|---|---|---|
| EVA 3165[1] | 300 | 300 | 300 | 300 | 300 |
| Zinc Stearate | 3 | 3 | 3 | 3 | 3 |
| Dicup 40KE[2] | 7.5 | 7.5 | 7.5 | 7.5 | 7.5 |
| TAIC[3] | 10 | 10 | 10 | 10 | 10 |
| Flectol H[4] | 3 | 3 | 3 | 3 | 3 |
| Hydrated Zinc Borate[5] | | 100 | | | |
| Microfil[6] | | | 100 | | |
| Solem SB-632[7] | | | | 100 | |
| Hydral 710[8] | | | | | 100 |
| Average Breakdown (Track) Voltage | 3.25Kv | 5.75Kv | 4.0Kv | 3.0Kv | 4.5Kv |

[1]DuPont ethylene-vinyl acetate copolymer.
[2]40% dicumyl peroxide.
[3]Coagent - triallylisocyanurate
[4]Antioxidant - Poly 1,2-dihydro-2,2,4-trimethylquinoline
[5]Firebrake ZB - $2ZnO.3B_2O_3.3.5H_2O$ - Average particle size is 2-10 microns.
[6]$Al_2O_3.3H_2O$ - Average particle size is 1 micron.
[7]$Al_2O_3.3H_2O$ - Average particle size is 3-4 microns.
[8]$Al_2O_3.3H_2O$ - Average particle size is 0.5-2 microns.

TABLE Ib

COMPARISON OF HYDRATED ZINC BORATE WTH ALUMINUM TRIHYDRATE

| | | | | | |
|---|---|---|---|---|---|
| LDPE 6005[9] | 150 | 150 | 150 | 150 | 150 |
| Nordel 1560[10] | 150 | 150 | 150 | 150 | 150 |
| TAIC | 10 | 10 | 10 | 10 | 10 |
| Flectol H | 3 | 3 | 3 | 3 | 3 |
| Dicup 40KE | 7.5 | 7.5 | 7.5 | 7.5 | 7.5 |
| Zinc stearate | 3 | 3 | 3 | 3 | 3 |
| Hydrated zinc borate | | 100 | 200 | | |
| Alumina trihydrate[7] | | | | 100 | 200 |
| Average breakdown voltage | 3.5KV | 4.5KV | 4.5KV | 3.5KV | 3.7KV |

[7]$Al_2O_3.3H_2O$ - Average particle size is 3-4 microns.
[9]Union Carbide low density polyethylene
[10]DuPont ethylene-propylene-diene terpolymer (EPDM)

EXAMPLE II

In this series of tests the effect of varying concentrations of hydrated zinc borate upon the track resistance of the sample material was compared. The results of these tests are summarized in Table II, wherein again, as throughout all examples herein, the units are parts by weight unless otherwise indicated.

TABLE II

CONCENTRATION EFFECTS OF ZINC BORATE

| | | | | | | | |
|---|---|---|---|---|---|---|---|
| EVA 3165 | 300 | 300 | 300 | 300 | 300 | 300 | 300 |
| Zinc Stearate | 3 | 3 | 3 | 3 | 3 | 3 | 3 |
| Dicup 40KE | 7.5 | 7.5 | 7.5 | 7.5 | 7.5 | 7.5 | 7.5 |
| TAIC | 10 | 10 | 10 | 10 | 10 | 10 | 10 |
| Flectol H | 3 | 3 | 3 | 3 | 3 | 3 | 3 |
| Hydrated Zinc Borate | 300 | 200 | 150 | 75 | 50 | 25 | — |
| Average Breakdown Voltage | 5.75Kv | 5.75Kv | 5.75Kv | 5.5Kv | 5.5Kv | 3.5Kv | 3.25Kv |

EXAMPLE III

The effectiveness of hydrated zinc borate as an anti-tracking additive in polymeric insulating materials other than EVA was examined. The results of these tests appear in Table III.

TABLE III

OTHER POLYMER SYSTEMS

| | | | | | | | | | | |
|---|---|---|---|---|---|---|---|---|---|---|
| EEA 6169[1] | 300 | 300 | | | | | | | | |
| LDPE 6005[2] | | | 300 | 300 | | | | | | |
| Hytrel 4056[3] | | | | | 300 | 300 | | | | |
| Nylon X4138[4] | | | | | | | 300 | 300 | | |
| Dimethyl Silicone Gum | | | | | | | | | 300 | 300 |
| Zinc Stearate | 3 | 3 | 3 | 3 | 3 | 3 | 3 | 3 | — | — |
| TAIC | 10 | 10 | 10 | 10 | 5 | 5 | 5 | 5 | — | — |
| Flectol H | 3 | 3 | 3 | 3 | 3 | 3 | 3 | 3 | — | — |
| Dicup 40KE | 7.5 | 7.5 | 7.5 | 7.5 | — | — | — | — | 8 | 8 |
| Hydrated Zinc Borate | — | 100 | — | 100 | — | 100 | — | 100 | — | 100 |
| Average Breakdown Voltage | 3.0 Kv | 4.5 Kv | 3.25 Kv | 4.0 Kv | 3.0 Kv | 3.0 Kv | 3.0 Kv | 3.0 Kv | 3.0 Kv | 3.0[5] Kv |

[1] Union Carbide ethylene ethylacrylate copolymer
[2] Union Carbide low density polyethylene
[3] DuPont polyester elastomer radiation cured with an electron beam to 15 Megarads
[4] Huls nylon elastomer radiation cured with an electron beam to 15 Megarads
[5] Indicates samples failed shortly after the start of the tests

EXAMPLE IV

The effect of radiation curing upon the track resistance of a polyolefin material containing hydrated zinc borate as an anti-tracking additive was also measured with the results shown in Table IV.

TABLE IV

RADIATION CURE EFFECTS
(15 Megarad Cure)

| | | | |
|---|---|---|---|
| EVA 3165 | 300 | 300 | 300 |
| Zinc Stearate | 3 | 3 | 3 |
| TAIC | 5 | 5 | 5 |
| Flectol H | 3 | 3 | 3 |
| Hydrated Zinc Borate | | 50 | 100 |
| Average Breakdown Voltage | 4.75Kv | 5.0Kv | 5.5Kv |

EXAMPLE V

The comparative erosion resistance of insulation materials containing alumina trihydrate and hydrated zinc borate respectively was measured. These tests followed the ASTM D 2303 procedure described above and subjected the samples to 2 KV for 1000 minutes. Since there is no defined failure point for erosion (unless perhaps a hole is eaten entirely through the sample) the depth and volume of the holes produced around the bottom electrode were compared. The depth measurements were made directly and the volume comparison was made by filling the holes with a plastic putty-like substance, allowing the putty to harden, and subsequently removing and weighing the volume of hardened putty thus produced. Since the weight of the putty was constant the weight comparison thus derived is indicative of this relative volume of the eroded holes in the samples. The results of this test appear in Table V.

TABLE V

| | | |
|---|---|---|
| EVA 3165 | 300 | 300 |
| TAIC | 10 | 10 |
| Flectol H | 3 | 3 |
| Dicup 40KE | 7.5 | 7.5 |
| Zinc stearate | 3 | 3 |
| Hydrated zinc borate | 100 | |
| Alumina trihydrate | | 100 |
| Average depth of eroded holes | .035" | .066" |
| Average weight of plastic to fill void | .045g | .228g |
| Relative volume of lost material | 1 | 5 |

It will accordingly be seen that while the particular theory which would explain the above results is not presently known, we have found that hydrated zinc borate functions as a better anti-tracking additive for polyethylene and related polyolefin based materials than hydrated alumina, the most widely accepted anti-tracking additive. It is not presently believed that the particle size of the hydrated zinc borate used has any significant effect upon its usefulness as an anti-tracking additive, however, water must be chemically bound to the zinc borate as in the hydrated compound $2ZnO.3B_2O_3.3.5H_2O$ in order to achieve the maximum effectiveness of the additive against creepage tracking. It will also be seen that hydrated zinc borate provides about five times the erosion resistance of alumina trihydrate thereby eliminating the need for additional additives in most situations.

It will further be understood that the embodiments and practices described and portrayed herein have been presented by way of disclosure, rather than limitation, and that various modifications, substitutions, and combinations may be effected without departure from the spirit and scope of this invention in its broader aspects. For example, the additive portion of the base polyolefin material will vary according to the physical properties desired and the particular polyolefin used. Similarly, the optimum concentration of hydrated zinc borate will vary in accordance with the insulation rating of the material and the expected context of its use.

We therefore claim:

1. Electrical apparatus comprising at least two spaced electrically conducting members between which electrical potentials may be developed, an organic insulating material disposed between said members and having an outer surface intermediate said members exposed to ambient contaminating atmospheric conditions, said surface material comprising a polymer or copolymer of ethylene which tends to form low resistance conducting paths under the influence of creepage type electrical discharges occurring under contaminating conditions and means for preventing the formation of said conducting paths due to creepage, said means comprising hydrated zinc borate dispersed in said surface material in an amount sufficient to increase the average breakdown voltage occurring during the course of the test procedure according to ASTM D2303 above the average breakdown voltage in the absence of said hydrated zinc borate.

2. Electrical apparatus according to claim 1 wherein the anti-tracking additive has the formula $2ZnO.3B_2O_3.3.5H_2O$.

3. Electrical apparatus according to claim 1 wherein hydrated zinc borate comprises about 25% by weight of said surface material.

4. Electrical apparatus according to claim 1 wherein the polymer or copolymer of ethylene is selected from the group consisting of ethylene-vinyl acetate copolymer, ethylene ethylacrylate copolymer, ethylene-propylene-diene terpolymer and polyethylene.

5. Electrical apparatus according to claim 1 wherein said hydrated zinc borate is dispersed in said surface material in an amount sufficient to increase the average breakdown voltage occurring during the course of the test procedure according to ASTM D-2303 by at least one kilovolt above the average breakdown voltage in the absence of said hydrated zinc borate.

6. Electrical apparatus according to claim 1 wherein said surface material is heat recoverable comprising a crosslinked polymer of ethylene having hydrated zinc borate dispersed therein as an anti-tracking additive.

* * * * *